(12) United States Patent
Parsons et al.

(10) Patent No.: US 7,736,685 B2
(45) Date of Patent: Jun. 15, 2010

(54) METHOD AND DEVICE FOR LIQUEFYING OF A POWDERY FAT BASED PRODUCT PARTICULARLY IN THE PRODUCTION OF CHOCOLATE AND THE LIKE

(75) Inventors: Nicholas Tyers Parsons, York (GB); Stuart Blackburn, Stafford (GB); Maxine Jolly, Derbyshire (GB); Stephen Thomas Beckett, York (GB); Stefan Reuss, Deutsch Evern (DE); Kate Armstrong, Pasadena, CA (US); Fernando Gomes, Sao Paulo (BR)

(73) Assignee: Nestec S.A., Vevey (CH)

( * ) Notice: Subject to any disclaimer, the term of this patent is extended or adjusted under 35 U.S.C. 154(b) by 1300 days.

(21) Appl. No.: 10/518,774

(22) PCT Filed: Jun. 10, 2003

(86) PCT No.: PCT/EP03/06022

§ 371 (c)(1),
(2), (4) Date: Aug. 29, 2005

(87) PCT Pub. No.: WO04/000028

PCT Pub. Date: Dec. 31, 2003

(65) Prior Publication Data

US 2006/0117965 A1  Jun. 8, 2006

(30) Foreign Application Priority Data

Jun. 21, 2002 (EP) .................... 02013803

(51) Int. Cl.
*A23G 1/00* (2006.01)
*B01F 5/06* (2006.01)
(52) U.S. Cl. ............... 426/631; 426/417; 366/340
(58) Field of Classification Search ............... None
See application file for complete search history.

(56) References Cited

U.S. PATENT DOCUMENTS

| 2,216,777 | A | * | 10/1940 | Hollstein | ............ 99/516 |
| 2,348,473 | A | * | 5/1944 | Hollstein | ............ 426/474 |
| 2,831,418 | A | * | 4/1958 | Ponisch | ............ 99/516 |
| 3,663,231 | A | | 5/1972 | Tourell | |
| 4,191,786 | A | | 3/1980 | Nappen et al. | |
| 4,679,498 | A | | 7/1987 | Chaveron et al. | |
| 4,834,635 | A | * | 5/1989 | Groen | ............ 425/72.1 |
| 4,861,615 | A | | 8/1989 | Wiedmann | |
| 5,554,409 | A | * | 9/1996 | Vezzani | ............ 426/631 |

FOREIGN PATENT DOCUMENTS

| DE | 199 07 782 A1 | 8/2000 |
| EP | 0 603467 A2 | 6/1994 |
| EP | 0 775 446 A2 | 5/1997 |

OTHER PUBLICATIONS

Beckett, S. T. 1988. Industiral Chocolate Manufacture and Use. Blackie Academic & Professional, New York p. 118-136.*
Minifie, B. 1980. Chocolate, Cocoa and Confectionery: Science and Technology, $2^{nd}$ edition. AVI Publishing Company, Inc., Westport, CT. p. 107-, 113-117.*

* cited by examiner

*Primary Examiner*—Carolyn A Paden
(74) *Attorney, Agent, or Firm*—K&L Gates LLP

(57) ABSTRACT

The invention relates to a method for lowering the viscosity of a fat based mixture comprising solids and fat that have been previously refined to a powdery mass characterized in that the powdery mass is submitted to elongational flow effective as such to provide breaking up of the agglomerates and intimate interactions of the solids with the fat thereby resulting in the production of a pasty mass with coating of the solids with the fat. The method enables to replace conching in a traditional conche or at least reduce conching time or increase the subsequent loading and throughput of the fat based mass in traditional conches.

15 Claims, 2 Drawing Sheets

METHOD AND DEVICE FOR LIQUEFYING OF A POWDERY FAT BASED PRODUCT PARTICULARLY IN THE PRODUCTION OF CHOCOLATE AND THE LIKE

BACKGROUND OF THE INVENTION

The present invention relates to a method and device for liquefying of a fat based mixture. The invention is particularly useful to replace or at least significantly shorten the traditional conching of fat based mixtures carried out in the chocolate making process.

In the traditional manufacture of chocolate or chocolate-like compounds, finely ground powders are dispersed in a continuous fat phase. The powders found in chocolate or chocolate-like compounds are traditionally sugar, cocoa solids and/or milk solids. These are mixed in differing proportions together with cocoa butter and/or vegetable fats, milk fats and emulsifier(s), such as lecithin. Plain chocolate is obtained by mixing sugar, cocoa butter, optionally other fats, and cocoa mass. Mills chocolate contains fat and milk non-fat solids as additional ingredients. White chocolate contains milk fat and milk non-fat solids, sugar and cocoa butter and/or vegetable fat without the addition of the cocoa mass or cocoa powder. Chocolate compounds may also be produced by using alternative fats in place of or in conjunction with natural cocoa butter. Such alternative fats belong to three main categories which are cocoa butter equivalents (CBE), cocoa butter substitutes (CBS), cocoa butter replacers (CBR). Detailed discussions of these different types of alternative fats can be found in a variety of sources, see for example, Traitler, H. et al., Journal of the American Oil Chemists Society, 62(2), 417-21 (1985).

In the traditional chocolate production method, the chocolate ingredients are normally mixed and ground in a refiner or mill to sufficiently reduce particle size of solids. Then, the paste is conched at a temperature from 50 to 110° C. for periods of time from a few hours to a few days depending on the type of product and the equipment used. The conched chocolate is then usually cooled after conching to set hard either without tempering or by tempering followed by cooling or allowing to stand for a suitable period of time.

Conching of the refined flakes is usually regarded as an essential production step for the development of the final texture of the chocolate. In the conching operation, shearing created in the conche causes the breaking up of the agglomerates, which are usually solids particles sticking together by pressure or water bonds. Then, the solids particles are coated with the fat and the fat phase finally disperses throughout the chocolate mass. Conching may additionally change the flavour and remove unwanted volatile compounds such as water or acetic acids by evaporation.

Devices for conching a chocolate refined mass have been developed for decades based on the principle of producing high shear flow on the mass by rotary means such as stripping elements or vanes revolving along an inner surface of large containers. For instance, a device for conching is known from DE 39 18 813 which consists of three axis-parallel cylindrical upwardly open chambers. These are a central main chamber with a greater diameter and two lateral subsidiary chambers. The three chambers merge into one another thereby forming the conche container. Mixing tools are disposed in each chamber on driven shafts. In general, high shearing and compression are both formed between the moving stripping tool and the static surface of the chambers. Due to the size to surface volume ratio of the known conching systems, only a small amount of chocolate mass is sheared at one time. Even while providing high shearing flow, the transition of the chocolate flake to the desired finished rheology is a time consuming process. Furthermore, the industrial conching machines occupy a considerable floor space in the factory and hence, the capital cost of these machines is very high.

Therefore, the conche is very important in the chocolate making process however it is a very inefficient mixer. With conche mixing taking up to a day to achieve the desired texture and quality, it is both an energy intensive and time consuming part of the chocolate processing.

Furthermore, the viscosity of the fat based mass is critical to produce the correct final product weight. For that, fat plays an essential role as it is the main ingredient used to coat the solid particles, plastify them and finally liquefy the mass. As fat is one of the most expensive major ingredients, any reduction of the fat content for a same level of viscosity reduction provides a significant economical advantage.

EP 0603487 A2 relates to a process for plastically extruding a fat-confectionery material comprising feeding a fat-confectionery material, usually chocolate, into an extruder barrel and applying pressure of a piston to the material in a substantially solid or semi-solid non-pourable form upstream a flow constriction of a die at a temperature at which the material is extruded isothermally. This process enables to form chocolate by extrusion. The starting material is a fat-based confectionery material in a liquid, paste or solid or semi-solid form but is already composed of solids that are already coated with the fat. Therefore, it is already chocolate product when entering into the extruder. Usually, this material is in the form of chocolate buttons. The process is a forming operation to provide a temporarily plastic end product from a solid material but is not an operation pertaining to the chocolate making process 'per se'.

EP 0 775 446 A2 also relates to cold extrusion of chocolate where the starting material is already chocolate.

U.S. Pat. No. 4,679,498 relates to a method and apparatus to prepare in a very short time a chocolate paste from a pasty mass of solids and cocoa butter. A refined paste is subjected to a dry conching treatment in a screw conveyor, the paste being obtained being then subjected to a liquefaction treatment by incorporation of additives in proportions in proportions according to the recipe. The dry conching stage comprises a first simple kneading and a second kneading step with production of shearing and rolling which intensity increases gradually. Conching in a screw conveyor like this provides essentially shearing and rolling by the screw, then, elongational flow at the exit of the conveyor. Applying shearing and rolling is energy consuming and it also requires complex and expensive extruding equipment. Extruding equipment provides also less versatility and requires important and expensive modifications of the tooling (e.g., exchange of the screw parameters, its pitch, size and shape) if one wants to modify the final characteristics of the output product such as its viscosity.

U.S. Pat. No. 4,861,615 also relates to preparing chocolate mixtures in a twin-screw extruders.

U.S. Pat. No. 3,663,231 refers to a continuous conche used in traditional chocolate factories which provides essentially shear forces to the fat and solid mass during the dry and liquid phases.

U.S. Pat. No. 4,191,786 relates to a cooking drying method for making a powder but not a liquefied mass.

Therefore, there is a need for a method that provides a quicker, more effective and less energy consuming way for reducing the viscosity of a previously refined fat based mass.

There is also a need for significantly reducing the residence time of the product in this processing stage while providing satisfactory rheological properties to the final compound.

There is further a need for a method that requires less floor occupation and is a continuous process which makes also changeovers between products easier.

There is further a need for a method that more efficiently lowers the viscosity of a fat based bulk material while making the best use of the amount of fat available to coat the solids with fat.

There is also a need for replacing the conching or at least reduce in conching the liquefying time and/or increase the loading or throughput of material in the conche.

There is also a need for a method that enables to reduce the amount of fat for essentially the same level of viscosity.

There is also a further need to provide a lower cost manufacturing process.

SUMMARY OF THE INVENTION

To attain these objects, the method is based on the principle that a fat based mixture comprising fat and solids not yet coated with the fat, which mixture has been previously refined to a powdery, can be submitted to elongational flow in a manner effective to provide breaking up of the agglomerates and intimate interactions of the solids with the fat thereby resulting in the production of a pasty mass with coating of the solids with the fat.

Therefore, the present invention has surprisingly found that the desired Theological attributes of a chocolate or chocolate-like mass can be achieved in a more effective way; i.e., the breaking up of agglomerates and pasting of the powdery fat based mass obtained much quicker and in a more economic manner, by applying an elongational flow as opposed to a predominant shear action on the starting confectionery mass as it has traditionally been done in a shear mixer such as a traditional conche.

For conching fat based solid masses, the known methods have all been by means of applying essentially shearing to the refined mass. As well known in fluids physic, shearing can readily be achieved by utilising the drag forces that exist within a fluid bounded by two relatively moving surfaces. Shearing in a conche is obtained by the drag forces that create between the rotor and the stator surface. Incidentally, the usual conches also produce some elongational flow between the wedge shaped end of the rotors and the surface of the containers. However, the elongational flow is carried out in a marginal way and it only effects a small amount of the material at a time in the conche. The elongational flow refers to the coating of the particles with fat in which material is squeezed through or spread over a surface as referred in "Industrial Chocolate Manufacturing And Use", Third Edition, Edited by S. T. Beckett, FIG. 9.2, pages 156-159.

More preferably, according to the invention, a predominant elongational flow is achieved by forcing a flow of a fat based mixture, preferably refined but non-liquefied, through a plurality of flow constrictions positioned in parallel and/or series relative to said flow. In a normal conche, only a small portion of the agglomerates is submitted to the shear at a time whereas the rest usually moves out of the way of the shearing zone. Therefore, it requires a long time before all the agglomerates have been spreaded by the shear created along the walls of the conche. On the contrary, in the present invention, the agglomerates can not escape since the product must traverse constrictions and are thus submitted to a substantially equivalent elongation effect.

The flow constrictions may preferably be constituted of a plurality of holes provided in at least one die plate.

The number, average diameter and shape of the holes may be selected depending on factors such as degree of elongational flow required, throughput rates, back pressure, recipes and combinations thereof. Therefore, the holes of the die plate(s) have an effective diameter of from 0.5 to 20 mm, preferably 0.5 to 10 mm, even most preferably 0.5 to 3 mm. The effective diameter is regarded as the smallest diameter as considered along the length of the hole which, in fact, controls the reduction of the viscosity. As a matter of fact, the smaller the diameter the thinner the mass becomes at the exit of the hole.

The number of holes in combination with the holes diameter also dictates the throughput rate. High throughput rates are achievable when the number of holes in the die plate preferably ranges of from 1 to 200 holes, even more preferably of from 10 to 100 holes in the preferred ranges of diameters defined. The die plate will be so sized to accommodate the number of holes and diameter range required for the intended result and desired throughput.

The longitudinal shape of the holes maybe determined according to the back pressure required for feeding the mixture through the die plate. A wide variety of holes geometry may be used that may effect the back pressure and the elongational flow. Therefore, holes may form a tapered, parallel, flared profile or any combinations thereof, as viewed from the inlet to the outlet of the holes. The diameter of the holes may be adjusted to advantageously reduce the generated back pressure and to create a more effective acceleration and longitudinal dispersion of the fluid flow through the holes. A lower back pressure enables to use less expensive equipment to push the mass through the die assembly at the required flow rate while achieving thinning of the mass. Furthermore, as resulting from a longitudinal direction of transport of the mass, the liquefying of the mass is carried out in a continuous manner and the residence time is considerably reduced.

The circumference of the holes does not appear to be a determining factor and the holes may have any shapes such as circular, square, triangular, polygonal, or other shapes.

The number of die plates may be adjusted according to the level of viscosity reduction desired. In a preferred embodiment, there is provided more than one separate die plate positioned in series in a barrel for serial passage of the product mixture through the die plates wherein any die plate n in the series is capable of lowering the viscosity and/or yield values of the mixture to a level that is further lower than the viscosity and/or yield values achieved by passing of the mixture through die plate n−1 in the series. The number n of die plates may be of from 1 to 10, preferably 1 to 3.

In a preferred aspect of the invention, the mixture is forced through a die assembly comprising at least one die member and on a continuous manner by means of a pressure generating means that exerts a positive pressure upstream the die assembly to positively move the mixture through the holes of the at least one die plate at a sufficient flow rate. The use of a pressure generating means enables a continuous transport of the mixture while achieving the intended viscosity lowering, therefore considerably reducing the residence time of material in the device. Residence times from the pressure generating means to the exit of the die members is of less than 2 minutes, even less than minutes of material in the device can be achieved. This configuration also allows to more precisely control the back pressure that is required according to the holes configuration of the die plate(s), the number of die plates, the viscosity reduction, the throughput rate desired and other relevant operational factors.

For that, the pressure generating means may be any sort of device adapted to produce a sufficient positive pressure upstream the die assembly of at least 5 bars, more preferably of at least 20 bars. The pressure generated from the pump is partially dependent, amongst other things, on the texture of the refined mass entering the die assembly, its formulation, the section of the holes, in particular, entry section, the number of die plates, temperature and flow rate. In particular, the pressure generating means may be a gear pump, a lobe pump, a piston pump or an extruder. Satisfactory results have been obtained with a gear pump that can be considered as the preferred embodiment to date.

Viscosity of the mass as obtained from the stage of elongational flow may greatly vary from a thick paste to a liquid. Hence, for instance, it may be suitable to deliver a relatively thick mass such as a mass used to make chocolate morsels in cookie production. In any case, it is preferred that at least 80%, even preferably 90%, of the agglomerates be removed from the feed mass as resulting from the elongational flow through the restrictions.

In a preferred aspect, the solid ingredients are added and mixed with fat and optionally emulsified in a mixer prior to being pressurized in the pressure means. If milling is carried out dry with little fat or no fat, as in an air classifier, the mixer is required especially for allowing a sufficient amount of fat to be homogeneously added to the mixture before the viscosity reduction by elongational flow can be effectively carried out.

The method of the invention may further comprise a final shear mixing carried out after the elongational flow has been carried out through the apertured dies in order to set up the final viscosity of the mixture and complete the addition of fat and/or emulsifiers of the final fat based mass. Therefore, when elongational flow, as previously defined, is carried out before conching, it considerably reduces the peak in power that is usually observed in the shear mixer or conche which is due to the energy consuming mixing action on the very thick mass at the beginning of the mixing in the conche (during the "loading phase"). A graph illustrating a typical conche water amperage during the stages of conching using a traditional conche is shown for instance in "Industrial Chocolate Manufacture and Use", Edited by Steve Beckett, Third edition, FIG. 9.6, Page 161.

Final mixing may be carried out in any conventional mixers such as in an in-line mixer such as a pin mixer or a batch mixer such as a conche or colloid mill. The advantage is that the volume that can be loaded in the mixer or conche can be much smaller than the volume of refiner flakes for which the density is much lower. Consequently, the mixer or conche can be charged more in product or, smaller mixers or conche can be used for an equivalent mass of product.

Where the final mixing device is a shear mixer such as a traditional conche, the method of the invention enables a reduction of the conching time for the same final viscosity of the fat based product, or alternatively, provides a lower viscosity for the same conching time, as it removes or, at least significantly reduces, the initial conching phases, known as being the loading phase and the dry conching phase, and makes the mass denser. Both of these enable bigger subsequent loading and improve throughputs in the shear mixer.

Where the final mixing is carried out in an in-line mixer for the primary purpose of adding fat and/or emulsifiers the method of the invention gives a simplified, continuous, lower floor area, lower cost alternative to traditional conching of fat based products. Furthermore, reaction flavours that are normally created during conching may also be achieved by other more efficient methods such as by making a chocolate crumb that is a pre-treatment that consists of making an intermediary product useful in the production of milk chocolate products to prevent rancidity and provide special milk flavours to these products. Such methods are described, for instance, in EP-A-940085 or in European co-pending patent application number 99 200 416.8. Other possible treatments for developing flavours are reactions process such as the liquid milk powder-compounded process in a Petzomat column. Removing of unwanted volatiles can also be carried out more efficiently than by conching by treating the cocoa mass such by passing the chocolate mass in thin stripping columns as described in "Industrial Chocolate Manufacture and Use", Third edition, Page 104-106. Furthermore, for some products, such as white chocolate or compounds made from cocoa powder, flavour reactions and flavour removal only play a small role and therefore do not require additional flavour related treatments.

The initial fat based material that can be liquefied according to the method of the invention includes, more particularly, powdery or pasty mixtures traditionally obtained after refining or milling of sugar solids and/or cocoa solids and/or milk solids with fat in order to reduce the particle size of the solids in the mixture. The fat may include cocoa butter, chocolate substitutes containing direct cocoa butter replacements, stearines, coconut oil, palm oil, butter or any mixtures thereof. The solids may include cocoa solids, sugar, sugar alcohols, sugar substitutes, milk such as skimmed milk or full cream milk powder, vegetable solids and any combinations thereof. After homogenization and refining the initial fat based material may result in flakes, powder or granules of differing particle size but more preferably of an average particle size, in particular, of less than 50 microns, even preferably less than 30 microns so that the final material is not gritty in the mouth. The proportion of fat may depend on the product to be liquefied. However, the proportion of fat of the refined mass, before operation in the die assembly, is preferably of from 20 to 35% by weight. Typically, under 20% fat, the mass is difficult to transform into a paste in the die assembly. The mass also preferably has a water content of less than 5%, even more preferably less than 1%.

In the method, emulsifiers may be added in small amounts at different stages to help further reduce viscosity such as lecithin, polyglyceryl polyricinoleate (PGPR), ammonium phosphatide or others.

The invention also relates to a device for reducing viscosity of a fat based mixture comprising solids and fat that have been refined to a powdery or pasty mass characterized in that it comprises a die assembly comprising at least one die plate with a plurality of holes and a pressure generating device to exert a pressure on the mixture upstream of the die means to force the fat based mixture through the holes of said die assembly and thereby create an elongational flow effective to achieve breaking up of the agglomerates and intimate interactions of the solids with the fat.

Additional features and advantages of the present invention are described in, and will be apparent from, the following Detailed Description of the Invention and the figures.

DETAILED DESCRIPTION OF THE INVENTION

The device of the invention comprises a pre-mixer 1 in which chocolate flakes are fed into a hopper 10 at one end of the pre-mixer. Fat and emulsifier such as lecithin are fed in the pre-mixer 1 through an inlet 11 and mixed with the chocolate flakes.

The mixture is conveyed by the conveying screw of the pre-mixer into the feed opening of a gear pump 2.

Figure 1:
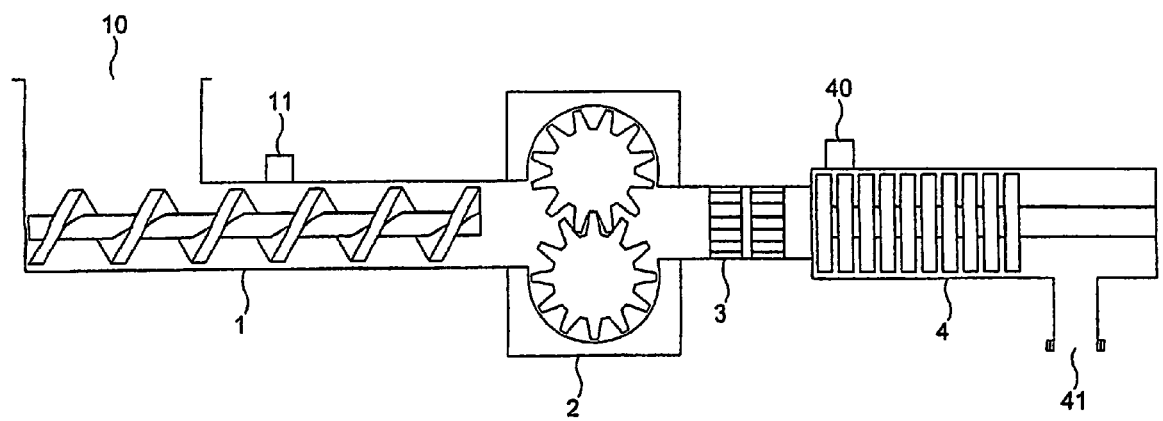
FIG. 1 a schematic illustration of a side view of the device according to a preferred embodiment of the invention.
Figure 2:
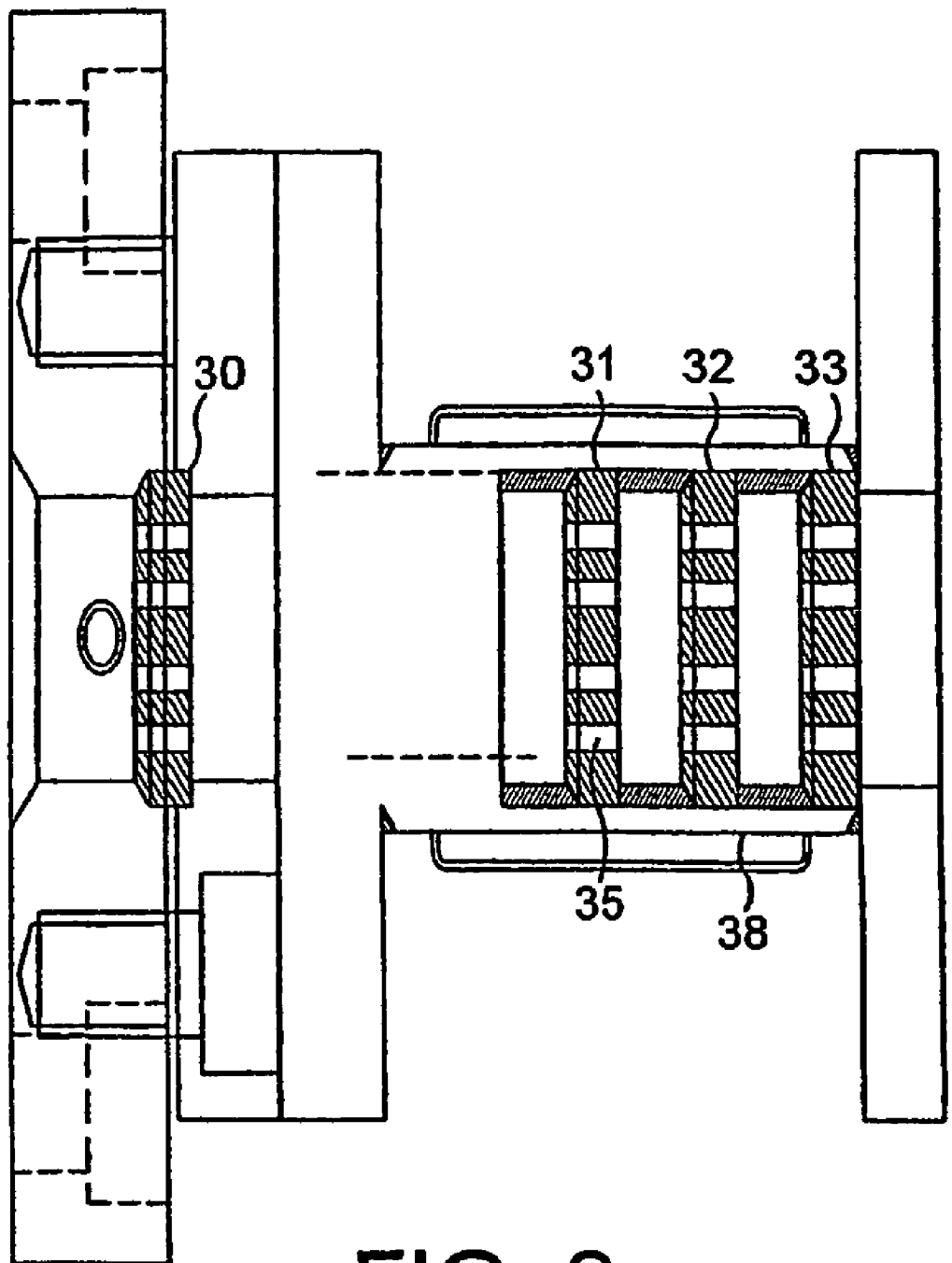
FIG. 2 is a cross-section view of the die assembly of the device of FIG. 1.

The pre-mixer has two main functions which are a) to mix the flakes with the required amount of fat and emulsifier and b) to feed the gear pump with the mixture in a continuous and steady way. The gear pump 2 compresses the pre-mixture and creates enough pressure to extrude the products through a following dies zone 3, as illustrated in greater details in FIG. 2. The mixture passes through the small holes 35 of several die plates 30, 31, 32, 33 positioned in series in a barrel 38 of the dies assembly 3. The holes have a parallel or tapered configuration with an angle relative to the longitudinal axis of the holes ranging of from about 0 to 85°. The temperature within the stage of elongation flow achieved in the gear pump and die plates can be controlled, in general of from 30 to 80° C. Some heat is produced by the shearing but additional heat can be provided in order to keep the fat flowable.

The elongational flow created by the serial passage through dies plates liquefies the mixture changing it from a powder to a paste or from a paste having a thick consistency to a paste having a reduced viscosity. The level of elongational flow may be controlled by different factors amongst them is an important variable the addition of the number of die plates to achieve the desired elongational flow for subsequent processing. After the product has been liquefied, the remaining fat and emulsifiers are added, at some point during the subsequent shearing process, to complete the recipe. The mixture is passed into a pin mixer 4 to homogenize it and also introduce additional shearing for further viscosity reduction. More fat and emulsifier can be added via inlet 40 in the pin mixer. The flow rate of the mixture through the plates may typically be of from 1.5 to 100 Kg/min.

The final fat-based liquid product exits the pin mixer by outlet 41 to be further processed as in traditional chocolate manufacturing such as tempering, moulding, extrusion, depositing, injection, enrobing, etc.

In an alternative mode, the pin mixer 4 may be replaced by a batch-type conche for further liquefying and fat and/or emulsifier addition. The elongational flow is preferably carried out at the start of the liquefying process before transfer of the mass into the conche. Suitable conche may be, for instance, a 3-ton Carle Montannari Clover conche or a 6-ton Frisse or Lipp conche. As a result of applying the preliminary elongational flow prior to conching, the paste contains fewer agglomerates and many of the particles are already coated with fat. Hence, by separating the elongational flow and normal shear in two sequential stages, the overall processing time is reduced and ultimate viscosity is set up to the desired level more effectively.

In the present invention the terms "refine" or "refined" refer to the general process of reducing particle size of solids in the fat based mixture by any suitable means such as in a roll refiner, a mill or any other similar apparatus.

The following examples further illustrate the present invention.

EXAMPLES

Example 1

Milk Chocolate 12 parts West African cocoa mass are mixed with 9 parts cocoa butter, 50 parts crystal sugar, 15 parts skimmed milk powder and 5.2 parts anhydrous milk fat, giving the resulting mix a fat content of about 23%. The mix is homogenised for 10 minutes and refined using roller refiners so that 90% of the particles are smaller than 30 microns, resulting in chocolate flakes (powdery material).

Example 1.1

Comparative

The chocolate flakes are conched using a 10 kg laboratory conche manufactured by Lipp GmbH. 5 part of cocoa butter are added to the 90.5 parts of chocolate flakes, dry conched for 3.5 hrs at 60 deg C. and at medium rotor speed. After 3.5 hours a further 4 parts of cocoa butter and 0.50 parts of lecithin emulsifier are added and mixed for 30 minutes, giving a final fat content of 30.3%.

The viscosity of the finished chocolate mass is measured using a Haake rotational viscometer and the Casson model is used analyse the data:

Plastic Viscosity PV=2.3 Pa·s
Yield Value YV=20.1 Pa

Example 1.2

Invention

The 90.5 parts of chocolate flakes are mixed with 3.8 parts of cocoa butter and 0.3 parts of lecithin using a low shear powder mixer. The resulting powder is fed to a 80 mm co-rotating intermeshing twin screw extruder. The extruder is heated to 70 deg C., the screw speed is 40 rpm and the screws is made up of conveying elements only (therefore creating no significant shear). At the end of the extruder screw the powder is extruded through a plate consisting of 17 holes each having a diameter of 2.5 mm with a throughput of 100 kg/hr. The residence time of the product within the extruder and hole plate is less than 2 minutes. A sample of the resulting mass is taken and the mass is returned to the extruder inlet and processed again through the hole plate. Again, a sample of the extruded mass is taken. In a third trial, the hole plate is changed to a plate containing 80 holes each 1.0 mm.

The three samples (94.6 parts) are mixed with a further 5.2 parts of Cocoa Butter and 0.2 parts of Lecithin, using a low shear mixer to avoid introduction of shear (giving the same overall composition as used in Example 1). The viscosity of the finished chocolate mass is measured using a Haake rotational viscometer and the Casson model is used to analyse the data:

1 st Pass
Plastic Viscosity PV=2.9 Pa·s
Yield Value YV=43.3 Pa
2nd Pass
Plastic Viscosity PV=2.9 Pa·s
Yield Value YV=37.9 Pa
3rd Pass
Plastic Viscosity PV=2.3 Pa·s
Yield Value YV=27.7 Pa The product made in Example 1.2 shows nearly the same viscosity as the sample made in Example 1.1, even though the throughput in Example 1.2 was significantly higher than in Example 1.1. Furthermore, the effect of the holes plates can be seen by comparing 1st, 2nd and 3rd pass. Due to the low speed of the extruder and the fact that only conveying elements were used it can be assumed that all the liquefication work was done in the hole plates, the extruder was used only for generating the necessary pressure.

Example 2

White Compound

Vegetable fat (cocoa butter equivalent, CBE) are mixed with sugar, full cream milk powder, anhydrous milk fat and lecithin so that the resulting mix has a fat content of about 30%. The mix is homogenised for 10 minutes and refined using roller refiners so that 90% of the particles are smaller than 30 microns, resulting in white flakes.

Example 2.1

Comparative

The chocolate flakes are conched using a 3-ton Carle Montanan Clover conche. The dry couching stage is carried out for 1 hour followed by a 2 hour liquid conching step. The final mass has a fat content of 34%, including 0.6% lecithin and 0.2% polyglycerolpolyricinoleate. The viscosity of the finished mass is measured using a Haake rotational viscometer and the following apparent viscosities were measured:
Apparent Viscosity at 15 $s^{-1}$ shear rate=6.8 Pa·s
Apparent Viscosity at 50 $s^{-1}$ shear rate=6.5 Pa·s Example 2.2

Invention

The same flakes as used in Example 2.1 are fed into a low shear blender in which CBE, lecithin and polyglycerolpolyricinoleate are added to the same overall composition as used in Example 2.1. The mix is conveyed into a high pressure gear pump which is extruding the mass through a plates having 69 holes each 1.5 mm diameter. The throughput of the system is 400 kg/hr, the residence time smaller than 2 minutes. The viscosity of the finished mass is measured using a Haake rotational viscometer and the following apparent viscosities were measured:
Apparent Viscosity at 15 $s^{-1}$ shear rate=7.3 Pa·s
Apparent Viscosity at 50 $s^{-1}$ shear rate=5.1 Pa·s
The product made in Example 2.2 shows a similar viscosity as the sample made in Example 2.1, however the residence time to liquefy the flakes is 2 minutes compared to three hours in the conventional conching unit. During a consensus tasting of a trained chocolate panel, no differences where found between the sample made in Example 2.1 and Example 2.2.

Example 3

Fat Reduction

Milk chocolate refiner flakes of about 26.5 wt. % fat are submitted to normal Bauermeister conche. The final Casson yield value of the conched mass obtained is 13.6 Pa and the plastic viscosity is 2.8 Pa·s. The same refiner flakes but with 1% less fat are treated by elongational treatment then conching in the same conche at the same temperature and for the same time. The Casson yield value of the conched mass obtained is 7.5 Pa and the plastic viscosity is 3.6 Pa·s.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method for lowering the viscosity of a fat based mixture comprising solids and fat that have been previously refined to a powdery mass, and with the solids being not significantly coated with the fat, comprising the step of subjecting the powdery mass to an elongational flow to break up agglomerates and intimate interactions of the solids with the fat thereby resulting in the production of a pasty mass and coating of the solids with the fat, wherein the elongational flow is achieved by forcing, under pressure and in a continuous manner, a flow of the powdery mass through a plurality of holes of at least one die plate, the holes positioned relative to the flow.

2. The method according to claim 1, wherein the plurality of flow constrictions are positioned in parallel or series relative to said flow.

3. The method according to claim 1 wherein the fat based mixture consists essentially of a component chosen from the group consisting of refined chocolate and chocolate-like powder compounds.

4. The method according to claim 1 wherein the elongational flow is carried out at a start of a liquefying process before shearing of the resulting fat based mixture in a shear mixer.

5. The method according to claim 4, wherein a final mixing is carried out in an in-line mixer to complete the addition of fat.

6. The method according to claim 4, wherein a final mixing is carried out in a batch type conche.

7. A method for lowering the viscosity of a fat based mixture comprising a powdery mass of solids and fat, the solids not being significantly coated with the fat, comprising the step of subjecting the powdery mass to an elongational flow that is sufficient to cause at least some of the agglomerates and intimate interactions of the solids with the fat to break thereby providing a pasty mass having a coating of the solids with the fat, wherein the elongational flow is achieved by forcing under pressure and on a continuous manner the powdery mass through a plurality of holes of at least one die plate.

8. A method for lowering the viscosity of a fat based mixture comprising solids and fat that have been previously refined to a powdery mass, and with the solids being not significantly coated with the fat, the method comprising:
subjecting the powdery mass to an elongational flow to break up agglomerates and intimate interactions of the solids with the fat thereby resulting in the production of a pasty mass and coating of the solids with the fat, wherein the elongational flow is achieved by forcing under pressure and on a continuous manner the powdery mass through a plurality of holes of at least one die plate and wherein the at least one die plate comprises a plurality of small size holes having a size of from 0.5 to 20 mm.

9. The method according to claim 8, wherein the holes form a tapered, parallel, flared profile as viewed from an inlet to an outlet of the holes.

10. The method according to claim 8 wherein at least two separate die plates positioned in series in a barrel are provided for serial passage of the fat based mixture through the die plates.

11. A method for lowering the viscosity of a fat based mixture comprising solids and fat that have been previously refined to a powdery mass, and with the solids being not significantly coated with the fat, the method comprising:

subjecting the powdery mass to an elongational flow to break up agglomerates and intimate interactions of the solids with the fat thereby resulting in the production of a pasty mass and coating of the solids with the fat, wherein the elongational flow is achieved by forcing under pressure and on a continuous manner the powdery mass through a plurality of holes of at least one die plate and wherein the at least one die plate comprises from 1 to 200 holes.

12. A method for lowering the viscosity of a fat based mixture comprising solids and fat that have been previously refined to a powdery mass, and with the solids being not significantly coated with the fat, the method comprising:

subjecting the powdery mass to an elongational flow to break up agglomerates and intimate interactions of the solids with the fat thereby resulting in the production of a pasty mass and coating of the solids with the fat, wherein the elongational flow is achieved by forcing under pressure and on a continuous manner the powdery mass through a plurality of holes of at least one die plate; and forcing the mixture through the at least one die plate by using a pressure generating means exerting a positive pressure upstream of the die plate.

13. The method according to claim 12, wherein the pressure generating means is selected from the group consisting of a gear pump, a lobe pump, a piston pump and an extruder.

14. The method according to claim 12, comprising adding solid ingredients and mixing the solid ingredients with the fat in a mixer prior to being pressurized in the pressure generating means.

15. A method for lowering the viscosity of a fat based mixture comprising solids and fat that have been previously refined to a powdery mass, and with the solids being not significantly coated with the fat, the method comprising:

subjecting the powdery mass to an elongational flow to break up agglomerates and intimate interactions of the solids with the fat thereby resulting in the production of a pasty mass and coating of the solids with the fat, wherein an average particle size of the solids of the refined fat based mixture has been reduced to less than 50 microns, wherein the elongational flow is achieved by forcing under pressure and on a continuous manner the powdery mass through a plurality of holes of at least one die plate.

\* \* \* \* \*